United States Patent [19]

Muscat

[11] 4,452,344

[45] Jun. 5, 1984

[54] DRUM BRAKE

[75] Inventor: Gérard Muscat, Blanc-Mesnil, France

[73] Assignee: Societe Anonyme DBA, Paris, France

[21] Appl. No.: 338,697

[22] Filed: Jan. 11, 1982

[30] Foreign Application Priority Data

Jan. 30, 1981 [FR] France .................. 81 01835

[51] Int. Cl.³ .......................................... F16D 65/58
[52] U.S. Cl. ........................ 188/79.5 GT; 188/196 B
[58] Field of Search .............. 188/79.5 GC, 79.5 GE, 188/79.5 GT, 79.5 P, 106 A, 196 F, 196 V, 196 B

[56] References Cited

U.S. PATENT DOCUMENTS

| 3,118,519 | 1/1964 | Swift | 188/79.5 |
| 3,368,648 | 2/1968 | Brownyer | 188/79.5 GT |
| 4,121,701 | 10/1978 | Gestkoff | 188/79.5 GT |

FOREIGN PATENT DOCUMENTS 2145378 3/1972 Fed. Rep. of Germany .
2397566 2/1979 France .
2418386 9/1979 France .

Primary Examiner—Duane A. Reger
Attorney, Agent, or Firm—Larry J. Palguta; Paul David Schoenle; Ken C. Decker

[57] ABSTRACT

The invention relates to a drum brake in which the strut (32, 132, 232) is maintained at an approximately constant distance relative to the brake motor (20, 120, 220). The brake comprises a strut (32, 132, 232) disposed between two brake shoes (12, 112, 212; 14, 114, 214) and maintaining the brake shoes in spaced-apart relationship through a wear compensating device (38, 137, 138, 237, 238). The strut includes an inclined plane (60, 160, 260) cooperating, in proportion to wear of the friction elements (16, 116, 216; 18, 118, 218), with a projection (64, 164, 264) carried by one shoe, the inclined plane approximating an arc of a circle centered on the center of rotation of the associated shoe during wear of the associated friction elements. The invention may be applied to brakes for automotive vehicles.

10 Claims, 7 Drawing Figures

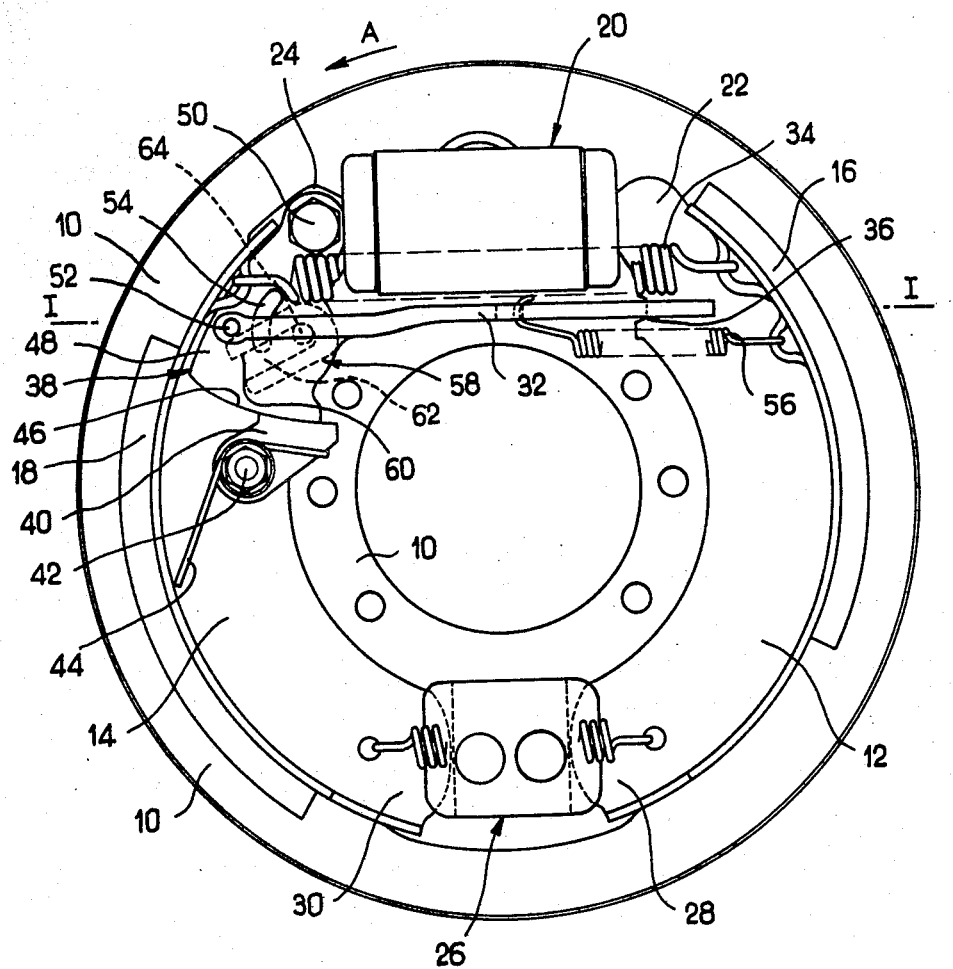
FIG_1
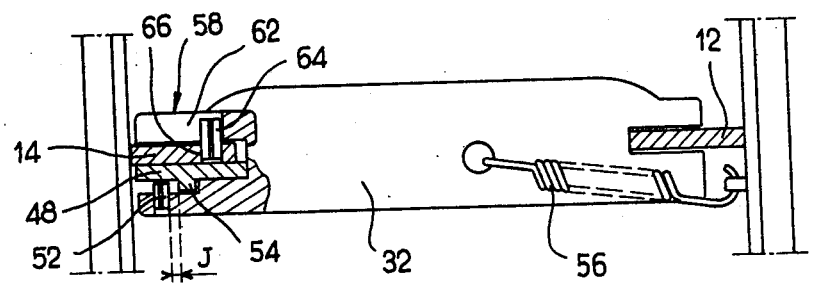
FIG_2

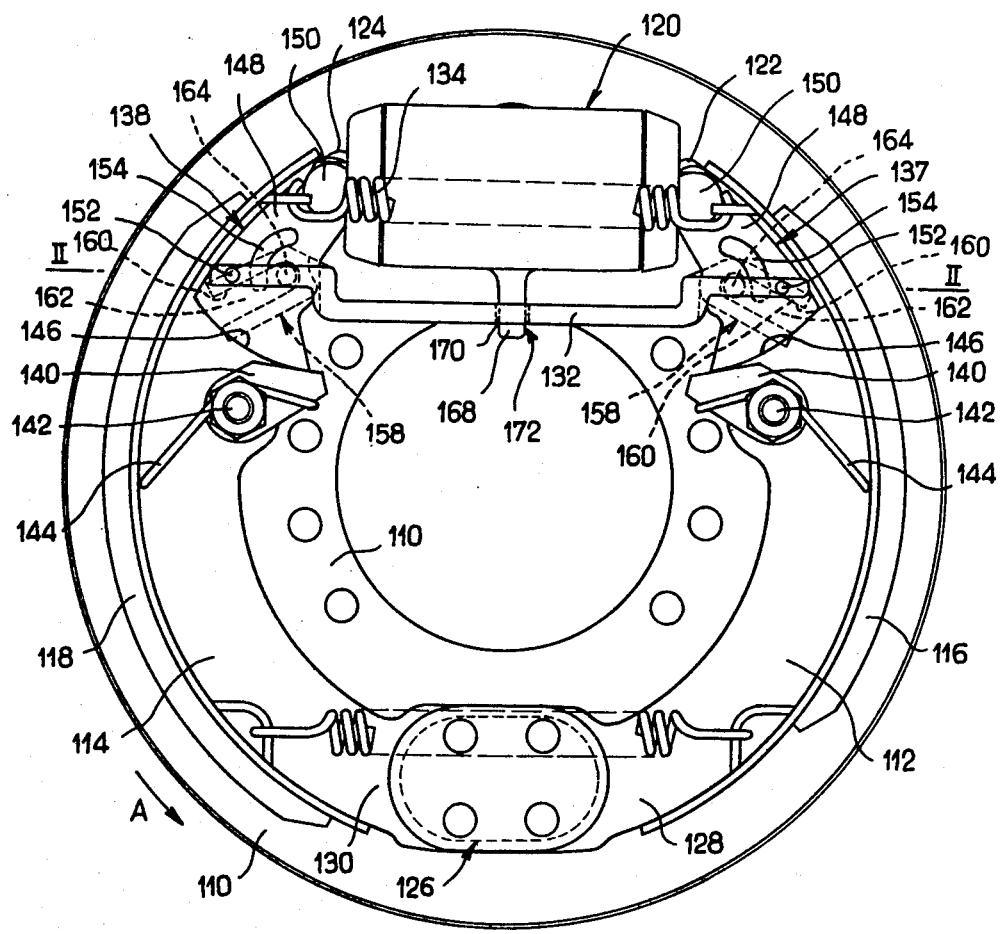
FIG_3
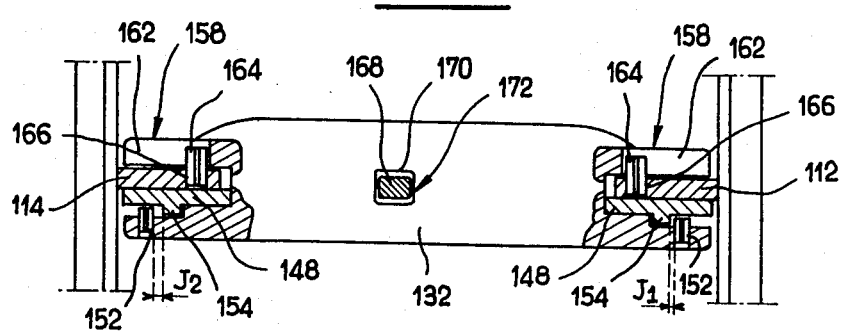
FIG_4

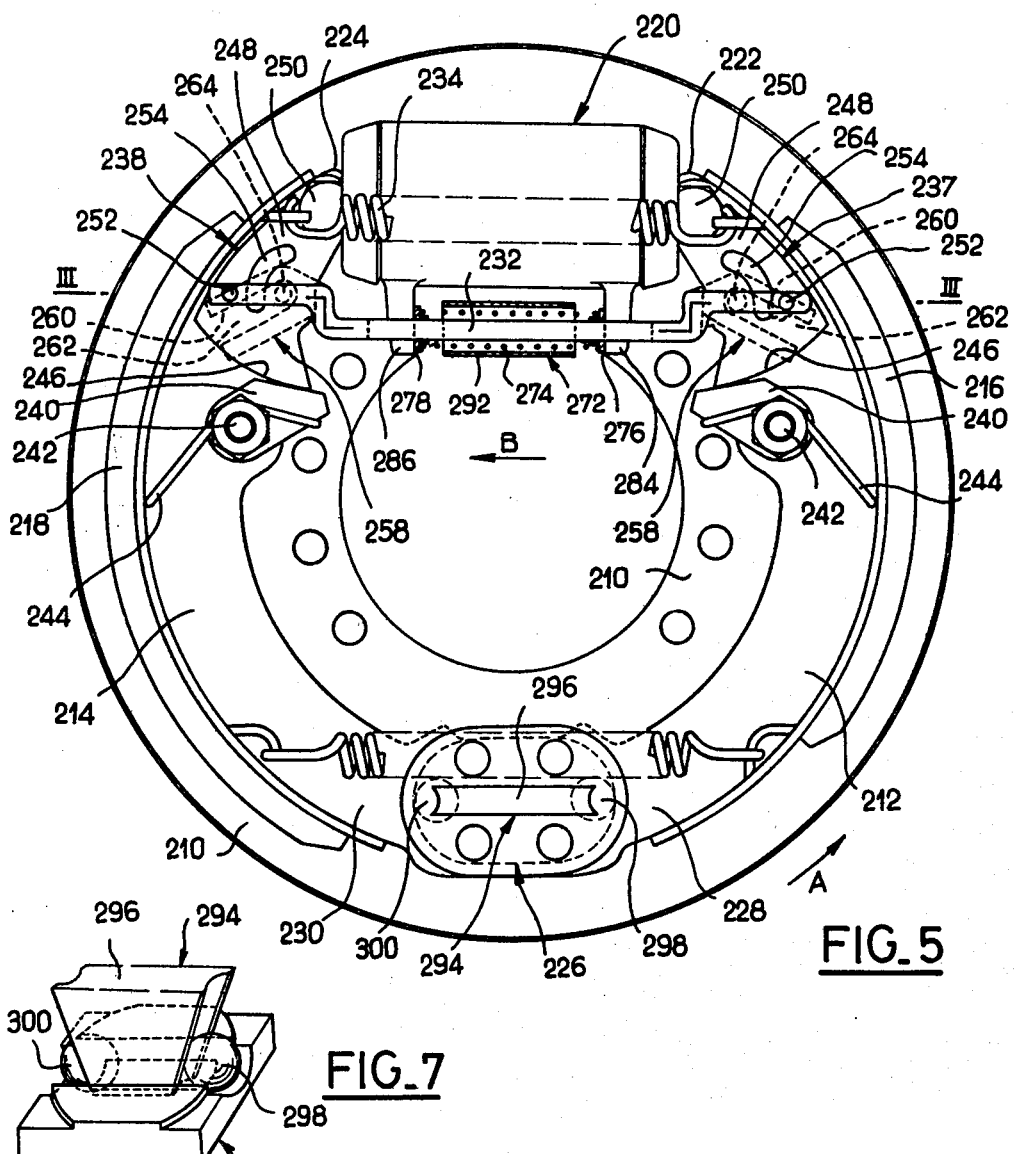
FIG. 5
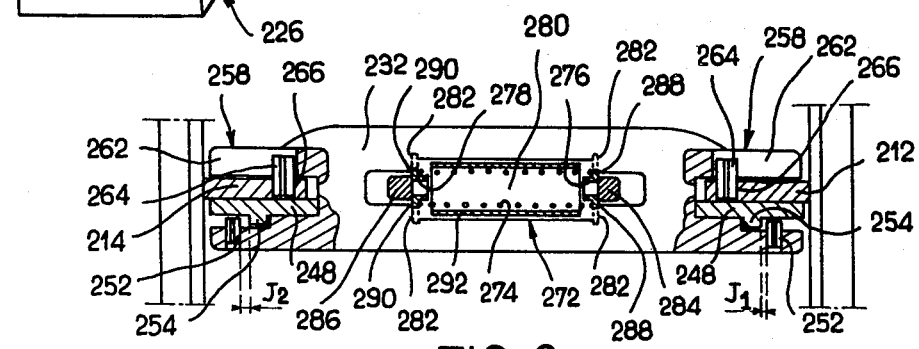
FIG. 7
FIG. 6

DRUM BRAKE

The invention concerns a drum brake.

The invention relates more particularly to a drum brake of the type comprising a supporting plate on which are mounted slidingly two shoes capable of being brought into frictional engagement against a rotating drum by a brake motor interposed between two adjacent ends of the shoes, and comprising a strut interposed between these same ends of the shoes and cooperating with at least one of the shoes through a wear compensating device.

In this type of drum brake, in proportion to wear of the friction elements, the shoes drive the strut in a movement tending to bring the latter closer to the axis of rotation of the drum. The central part of the brake being traversed by the hub on which is fixed the drum and the wheel of the vehicle, movement of the strut in the direction of this hub may cause it to come into contact with the rotating hub, this movement being all the greater as the thickness of the friction elements to be worn away is great. Contact between the strut and the hub may have two major disadvantages, on the one hand limitation of the movement of said strut may bring about incorrect functioning of the brake, and on the other hand friction between the strut and the hub may bring about breaking, after wearing away, either of the strut or of the hub.

The invention proposes a brake of the type defined above in which such disadvantages are avoided, the brake comprising a device maintaining said strut in an approximately constant position relative to its initial position, this being whatever the state of wear of the friction elements.

With this object, the invention proposes a drum brake comprising a supporting plate on which are mounted slidingly two shoes comprising friction elements and capable of being brought into frictional engagement against a rotating drum by a brake motor interposed between two first adjacent ends of said shoes and comprising a strut placed between said shoes and cooperating with at least one of said shoes through a wear compensating device designed to maintain said shoes at a relative distance which is all the greater as wear of the friction elements is high, characterised in that the brake comprises a device for maintaining the strut at an approximately constant distance from the brake motor, said distance maintaining device connected on the one hand to one of said shoes and on the other hand to said strut and comprising an inclined plane and a projection capable of cooperating during relative displacement of said two shoes.

Three embodiments of the invention will now be described, by way of example without limitations, in which FIGS. 1 and 2 show a first embodiment, FIGS. 3 and 4 a second embodiment and FIGS. 5 to 7 a third embodiment:

FIG. 1 shows a plan view of a drum brake according to the invention;

FIG. 2 shows a view in section along line I—I of the brake of FIG. 1;

FIG. 3 shows a plan view of a drum brake according to a second embodiment;

FIG. 4 is a view in section along line II—II of the brake of FIG. 3;

FIG. 5 is a plan view of a drum brake according to a third embodiment;

FIG. 6 shows a view in section along line III—III of the brake of FIG. 5; and

FIG. 7 shows a schematic perspective view of a brake motor used in the brake of FIG. 5.

The drum brake shown in FIGS. 1 and 2 comprises a supporting plate 10 normally associated with a fixed part of the vehicle (not shown) on which are mounted slidingly two brake shoes 12 and 14 bearing friction elements 16 and 18 respectively. A brake motor designated in its entirety by the reference 20 is interposed between the first ends 22 and 24 of the shoes 12 and 14 respectively. An anchor block designated in its entirety by the reference 26 is interposed between the other two ends 28 and 30 respectively of the shoes 12 and 14. A strut 32 is placed in the vicinity of the brake motor 20. A spring 34 normally urges the shoe 12 into abutment against the strut 32 through a notch 36 formed on the shoe 12. In the same way, the spring 34 urges the shoe 14 into abutment against the strut 32 via a wear compensating device 38.

The wear compensating device 38 comprises a pawl 40 mounted pivotably, via a rivet or equivalent, forming a pivot 42 on the web of the shoe 14. The end of the pawl 40 is maintained in contact, by the action of a torsion spring 44, with a toothed sector 46 formed on the end of a lever 48 mounted pivotably via a rivet or equivalent forming a pivot 50 on the web of the shoe 14. The wear compensating device 38 is set in operation by a split cylindrical pin 52 mounted on the strut 32 and capable of cooperating with a projection 54 carried by the lever 48 after an approach path J as shown in FIG. 2. A spring 56 maintains the strut 32 in abutment on the shoe 12 to allow setting in operation of the wear compensating device 38.

The strut 32 bears a device for maintaining the strut at an approximately constant distance from the brake motor, said device comprising an arm 58 formed on the strut 32 in which is formed an inclined plane 60 by means of a rectilinear notch 62. The inclined plane 60 is capable of cooperating with a split pin 64 mounted in a bore 66 formed on the shoe 14.

The brake which has just been described operates in the following manner:

At rest, the different elements of the brake occupy the positions shown in FIGS. 1 and 2. On setting the brake in operation by means of the brake motor 20, the latter urges the shoes 12 and 14 apart, thus bringing the friction elements 16 and 18 into frictional engagement with the rotating drum (not shown). The shoes 12 and 14 are in anchoring abutment on the anchor block 26 by their ends 28 and 30 respectively. If wear compensation is necessary, the lever 48 is urged by the split cylindrical pin 52 through the projection 54 so that the pawl 40 jumps one or more teeth on the toothed sector 46, in such a way that the distance between the ends 22 and 24 of the shoes becomes greater than before setting the brake motor 20 in operation. The spring 56 has a force sufficient to maintain the strut 32 in abutment on the notch 36 formed on the shoe 12.

Designating by the arrow A the direction of rotation of the drum (not shown) during operation while moving forwards, the shoe 12 is defined as being the tensioned shoe and the shoe 14 as being the compressed shoe, the brake being of the floating shoe type.

In this type of brake, it is ascertained that during wear of the friction elements the end 22 of the tensioned shoe 12 is displaced to the right and upwards, referring to FIG. 1, and the end 24 of the compressed shoe 14 is displaced to the left and downwards, still referring to FIG. 1. It is likewise ascertained that wear of the friction element 16 of the shoe 12 is clearly less than wear of the friction element 18 of the shoe 14, and consequently that upward movement, referring to FIG. 1, of the end 22 of the shoe 12 is clearly less than downward movement of the end 24 of the shoe 14. Upward movement of the shoe 12 and hence of the strut 32 is not awkward due to the fact that the latter moves away from the rotating hub (not shown) all the more as this upward movement is of low amplitude. In proportion to wear of the friction elements 16 and 18 respectively of the shoes 12 and 14, the distance between the ends 22 and 24 of the shoes becomes greater, this distance apart being maintained by means of the wear compensating device 38. This relative movement of the shoes, due to abutment of the strut 32 on the notch 36 of the shoe 12, induces relative movement between the strut 32 and the shoe 14, more precisely between the strut 32 and the split pin 64 carried by the shoe 14. This relative movement in the longitudinal direction of the strut 32 induces cooperation of the inclined plane 60 and the split pin 64, urging the strut 32 upwards referring to FIG. 1. The inclination of the inclined plane 60 is such that upward driving of the strut 32 relative to the shoe, corresponds to downward movement of the shoe 14; the strut 32 therefore remaining approximately fixed relative to the brake motor 20.

A second embodiment of a drum brake according to the invention has been shown in FIGS. 3 and 4. In this second embodiment, members fulfilling functions approximately identical with members of the first embodiment have been designated by the same reference numbers increased by 100.

The brake shown in FIGS. 3 and 4 comprises a supporting plate 110 normally associated with a fixed part of the vehicle (not shown) on which are mounted slidingly two brake shoes 112 and 114 bearing friction elements 116 and 118 respectively. A brake motor designated in its entirety by the reference 120 is interposed between the first ends 122 and 124 of the shoes 112 and 114 respectively. An anchor block designated in its entirety by the reference 126 is interposed between the other two ends 128 and 130 respectively of the shoes 112 and 114. A strut 132 is placed in the vicinity of the brake motor 120. A spring 134 normally urges the shoe 112 into abutment against the strut 132 via a wear compensating device 137. In the same way, the spring 134 urges the shoe 114 into abutment against the strut 132 via a second wear compensating device 138.

The wear compensating devices 137 and 138 each comprise a pawl 140 mounted pivotably, via a rivet or equivalent, forming a pivot 142 respectively on the webs 112 and 114. The end of the pawl 140 is maintained in contact, by the action of a torsion spring 144, with a toothed sector 146 formed on the end of a lever 148 mounted pivotably via a rivet or equivalent forming a pivot 150 respectively on the web of the shoe 112 and of the shoe 114. The wear compensating devices 137 and 138 are set in operation, each for its part, by a split cylindrical pin 152 mounted on the strut 132 and capable of cooperating with a projection 154 carried by each of the levers 148 after an approach path J₁ and J₂ respectively as shown in FIG. 4. A projection 168 integral with the brake motor 120 penetrates an opening 170 formed in the strut 132 so as to fix the latter in the longitudinal direction, thus forming a centering device 172 to allow setting in operation of the wear compensating devices 137 and 138.

The strut 132 comprises at each of its ends a device for maintaining the strut at an approximately constant distance from the brake motor, said devices being formed by arms 158 formed on the strut 132 in which are constructed inclined planes 160 by means of notches 162. The inclined planes 160 are capable of cooperating with split pins 164 mounted in bores 166 formed in the shoes 112 and 114.

The brake which has just been described referring to FIGS. 3 and 4 operates in the following manner:

At rest, the different elements of the brake occupy the positions shown in FIGS. 3 and 4. On setting the brake in operation by means of the brake motor 120, the latter urges the shoes 112 and 114 apart, thus bringing the friction elements 116 and 118 into frictional engagement with the rotating drum (not shown). The shoes 112 and 114 are in anchoring abutment on the anchor block 126 by their ends 128 and 130 respectively, the ends 126 and 130 as well as the anchor block 128 are constructed so as to allow articulation of the shoes 112 and 114 relative to said anchor block 126. If wear compensation is necessary, the levers 148 are urged by the split cylindrical pins 152 through the projections 154 so that the pawls 140 jump one or more teeth on the toothed sectors 146, in such a way that the distance between the ends 122 and 124 of the shoes becomes greater than before setting the brake motor 120 in operation. Cooperation of the projection 168 and the opening 170 allows the strut 132 not to be displaced to the right or left, referring to FIG. 3, so that each of the wear compensating devices 137 and 138 functions appropriately, that is, each of the wear compensating devices compensates wear of the corresponding friction element.

Designating by the arrow A the direction of rotation of the drum (not shown) during operation while moving forwards, the shoe 112 is defined as being the tensioned shoe and the shoe 114 as being the compressed shoe, the brake being of the type with shoe articulated on the anchor block.

In this type of brake, it is ascertained that during wear of the friction elements, the end 122 of the tensioned shoe 112 is displaced to the right and downwards referring to FIG. 3, and the end 124 of the compressed shoe 114 is displaced to the left and downwards, still referring to FIG. 3. It is likewise ascertained that wear of the friction element 116 of the shoe 112 is clearly less than wear of the friction element 118 of the shoe 114, and consequently downward movement, referring to FIG. 3, of the end 122 of the shoe 112 is clearly less than downward movement of the end 124 of the shoe 114; in fact, the two shoes 112 and 114 are articulated on the anchor block 126. In proportion to wear of the friction elements 116 and 118 respectively of the shoes 112 and 114, the distance between the ends 122 and 124 of the shoes becomes greater, this distance apart being maintained by means of the wear compensating devices 137 and 138. This relative movement of the shoes, due to longitudinal fixing of the strut 132 by means of the projection 168 and the opening 170, induces a relative movement between the strut 132 and each of the shoes 112 and 114, more precisely between the strut 132 and each of the split pins 164 carried by the shoes 112 and 114. These relative movements in the longitudinal direction of the strut 132 induce cooperation of the inclined planes 160 and split pins 164, urging the strut 132 upwards, referring to FIG. 3. The inclination of the inclined planes 160 is such that upward driving of the strut 132 relative to the shoes corresponds to downward movement of the shoes 112 and 114; the strut 132 therefore remaining approximately fixed relative to the brake motor 120.

A third embodiment of a drum brake according to the invention has been shown in FIGS. 5 to 7. In this third embodiment, the members fulfilling functions approximately identical with members of the first embodiment have been designated by the same reference numbers increased by 200.

The brake shown in FIGS. 5 to 7 comprises a supporting plate 210 normally associated with a fixed part of the vehicle (not shown) on which are mounted slidingly two brake shoes 212 and 214 bearing friction elements 216 and 218 respectively. A brake motor designated in its entirety by the reference 220 is interposed between the first ends 222 and 224 of the shoes 212 and 214 respectively. An anchor block designated in its entirety by the reference 226 is interposed between the other two ends 228 and 230 respectively of the shoes 212 and 214. A strut 232 is placed in the vicinity of the brake motor 220. A spring 234 normally urges the shoe 212 into abutment against the strut 232 via a wear compensating device 237. In the same way, the spring 234 urges the shoe 214 into abutment against the strut 232 via a second wear compensating device 238.

The wear compensating devices 237 and 238 each comprise a pawl 240 mounted pivotably, via a rivet or equivalent, forming a pivot 242 respectively on the webs of the shoes 212 and 214. The end of the pawl 240 is maintained in contact, by the action of a torsion spring 244, with a toothed sector 246 formed on the end of a lever 248 mounted pivotably via a rivet or equivalent forming a pivot 250 respectively on the web of the shoe 212 and the shoe 214. The wear compensating devices 237 and 238 are set in operation, each for its part, by a split cylindrical pin 252 mounted on the strut 232 and capable of cooperating with a projection 254 carried by each of the levers 248 after an approach path $J_1$ and $J_2$ respectively as shown in FIG. 6. The strut 232 bears a centering device designated in its entirety by the reference 272. This device comprises a spring 274 mounted between two cups 276 and 278 placed in an opening 280 formed on the strut 232. The cups 276 and 278 comprise projections 282 allowing them to slide in the opening 280 formed in the strut. The cups 276 and 278 are supported on the one hand on fixed bearing elements 284 and 286 carried by the brake motor 220 and on the other hand on bearing portions 288 and 290 formed by shoulders constructed in the opening 280 of the strut 232. A tube 292 is mounted around the spring 274 to avoid the latter deflecting.

The strut 232 comprises at each of its ends a device for maintaining the strut at an approximately constant distance from the brake motor, said devices being formed by arms 258 formed on the strut 232 in which are constructed inclined planes 260 by means of notches 262. The inclined planes 260 are capable of cooperating with split pins 264 mounted in bores 266 formed in the shoes 212 and 214.

Between the ends 228 and 230 respectively of the shoes 212 and 214 is interposed a second brake motor designated in its entirety by the reference 294. This brake motor 294 is of the mechanically actuated type and may be of the type of the one described in the French patent published under the No. 2 291 411 and shown schematically in FIG. 7. This motor comprises a wedge 296 capable of urging apart two spherical elements 298 and 300 which themselves urge apart the ends 228 and 230 of the shoes 212 and 214 respectively.

The brake which has just been described referring to FIGS. 5 to 7 operates in the following manner:

At rest, the different elements of the brake occupy the positions shown in FIGS. 5 to 7. On hydraulic setting in operation of the brake, pressurization of the brake motor 220 urges the shoes 212 and 214 in anchorage against the bearing surfaces formed on the anchor block 226, thus bringing the friction elements 216 and 218 into frictional contact with the drum (not shown). If compensation of wear of the linings is necessary, the levers 248 are urged by the split cylindrical pins 252 through the projections 254 so that the pawls 242 jump one or more teeth on the toothed sectors 246 in such a way that the distance between the ends 222 and 224 of the shoes becomes greater than before setting the brake motor 220 in operation. The spring 274 of the centering device 272 having a prestress such that the strut 232 remains stationary during movement of the shoes 212 and 214 and therefore during setting in operation of the wear compensating devices 237 and 238. Operation is then identical with that described for the second embodiment.

On setting the brake in operation by means of the mechanical brake motor 294, the wedge 296 is urged downwards, considering FIG. 7, in such a way that it tends to move apart the balls 298 and 300 which urge the ends 228 and 230 respectively of the shoes 212 and 214 apart from each other. Designating by the arrow A the direction of rotation of the drum (not shown), frictional engagement of the friction element 216 drives the shoe 212 in the direction of the arrow A. The shoe 212 undergoes a reaction of abutment on the strut 232 which is displaced in the direction of the arrow B, thus urging the shoe 214 into frictional engagement against the rotating drum. The shoe 214 undergoes a reaction of abutment on the anchor block 226, driving back the ball 300. During movement of the strut 232, the cup 276 is driven by the shoulder 288 of the opening 280 away from the fixed bearing element 284, this being while compressing the spring 274. The cup 278 being in abutment on the fixed bearing element 286 does not move. On release of braking, the spring 274 drives back the strut 232 via the cup 276 supported on the shoulder 288 until said cup 276 comes into abutment on the fixed bearing element 284, the strut 232 thus regaining its recentered position relative to the brake. In the operation by mechanical control which has just been described, the strut 232 being on the one hand maintained centered by the centering device 272 and on the other hand maintained in an approximately constant position relative to the brake motor 220 on account of the two distance maintaining devices placed at the two ends of said strut will only have little movement relative to the brake motor.

It is evident from the preceding description that the device for maintaining the strut at an approximately constant distance from the brake motor, in the three embodiments described, allows interference to be avoided between the strut and the rotating hub passing through the center of the brake.

In the three embodiments described, the inclined plane 60, 160, 260 is rectilinear for reasons of ease of manufacture, normally this inclined plane would have to be the shape of an arc of a circle centered on the axis of rotation of the shoe. Experience has shown that replacement of this arc of a circle by a straight portion allowed the strut to be kept in an approximately constant position relative to the brake motor. The shape of the inclined plane may therefore be any shape comparable, within reasonable limits, to an arc of a circle without departing from the scope of the invention.

It goes without saying that the three drum brakes which have just been described by way of examples do not limit the scope of the invention and that the latter may be applied to different variants of drum brake, in particular the brakes may comprise parking brake controls other than that described in the third embodiment, similarly the brake motors may be hydraulic or mechanical, the inclined planes may be formed on the shoes, the projections being carried by the strut without departing from the scope of the invention.

I claim:

1. A drum brake comprising a drum, a supporting plate, two brake shoes slidingly supported on said supporting plate, brake shoe friction elements capable of being brought into frictional engagement with said drum, brake motor means interposed between two first adjacent ends of said shoes and for urging the shoes and frictional elements into engagement with said drum, a strut positioned relative to said shoes, a wear compensating device associated with one of said shoes and for maintaining said shoes at a relative distance which increases as wear of the friction elements increases, the strut engaging the wear compensating device to actuate the device when the shoes and friction elements are urged into engagement with the drum, and a strut positioning mechanism for maintaining the strut at an approximately constant distance from the brake motor means, said mechanism comprising a plane inclined relative to the strut and connected to one of said strut and one shoe and a projection connected to the other of said strut and one shoe, whereby displacement of the shoes by the motor means and actuation of the wear compensating device by the strut effect engagement of the inclined plane with the projection to displace the strut and maintain said approximately constant distance of the strut from said brake motor.

2. The drum brake in accordance with claim 1, wherein the projection is connected to said one shoe and the inclined plane is connected to said strut.

3. The drum brake in accordance with claim 1, further comprising a strut projection, a wear compensation abutment carried by the wear compensating device, and a resilient spring maintaining the relative position of the strut in relation to the shoes, whereby the strut projection engages the wear compensation abutment to effect said actuation.

4. The drum brake in accordance with claim 1 or claim 2, further comprising a second strut positioning mechanism associated with the other of said shoes, whereby said strut positioning mechanisms maintain the strut at said approximately constant distance from the brake motor means.

5. The drum brake in accordance with claim 4, further comprising an extension fixed relative to said support plate, and extension receiving means disposed at said strut, said extension receiving means receiving the fixed extension to maintain the longitudinal position of said strut during operation of the brake motor means.

6. The drum brake in accordance with claim 1, further comprising second brake motor means disposed between second adjacent ends of the shoes, and a brake shoe recentering device supported by said strut and engaging abutment means fixed relative to said support plate, said recentering device effecting recentering of the brake shoes to a central position relative to the drum after cessation of braking operation.

7. The drum brake in accordance with claim 3, wherein said projections comprise split cylindrical pins.

8. The drum brake in accordance with claim 1, wherein said inclined plane is rectilinear.

9. The drum brake in accordance with claim 6, wherein the strut includes an opening with shoulders and said recentering device comprises two cups slidingly mounted within the opening of said strut, each cup being supported by said strut for slidable movement therewith, and resilient means disposed between said cups, each of said cups engaging abutment means and shoulders of said strut.

10. In a drum brake assembly including a drum, a support plate, two brake shoes movably mounted on said plate, friction elements attached to said brake shoes, brake motor means located between first adjacent ends of the shoes, a strut disposed between the shoes, a brake shoe wear compensating device attached to one of said shoes and for spacing apart said shoes to a relative distance which increases as the friction elements wear, the strut engaging the wear compensating device in accordance with wear of the friction elements when the elements engage the drum, and a positioning mechanism for maintaining the strut at approximately the same distance from the brake motor means, said mechanism comprising a slot opening having a plane inclined relative to the strut and connected to one end of said strut and a shoe projection connected to an associated end of the shoe, the shoe projection being received by the slot opening and engaging the plane, whereby displacement of the shoes and actuation of the wear compensation mechanism effect slidable engagement between the inclined plane and the shoe projection to effect displacement of the strut and maintain the approximate same distance of the strut from the motor means during brake operation.

* * * * *